United States Patent

[15] 3,647,983
[45] Mar. 7, 1972

Fitzsimons et al.

[54] KEY SYSTEM LINE CARD CIRCUIT

[72] Inventors: Alan R. Fitzsimons, Laguna Beach; Robert J. Phelps, Anaheim, both of Calif.

[73] Assignee: San/Bar Electronics Corporation, Long Beach, Calif.

[22] Filed: Aug. 25, 1969

[21] Appl. No.: 852,585

[52] U.S. Cl. ....................179/99, 179/84 A
[51] Int. Cl. ....................H04m 1/00
[58] Field of Search ....................179/99, 90 K, 16.5, 84 R, 84 A

[56] References Cited

UNITED STATES PATENTS

| | | | |
|---|---|---|---|
| 2,038,303 | 4/1936 | Mathies | 179/16.5 |
| 2,862,062 | 11/1958 | Carter | 179/99 |
| 3,420,963 | 1/1969 | Abbott et al. | 179/99 |
| 3,436,488 | 4/1969 | Barbato et al. | 179/99 |
| 3,187,108 | 6/1965 | Clin et al. | 179/84 |

*Primary Examiner*—Kathleen H. Claffy
*Assistant Examiner*—Thomas W. Brown
*Attorney*—Jackson & Jones

[57] ABSTRACT

A line card circuit for a key telephone system which system includes a subscriber line comprising a pair of line conductors interconnecting a central office with a subscriber station set. The line card circuit has sensing means which are responsive to ringing signals in the line conductors to initiate local signaling indicative of the presence of an incoming call. Means are provided to assure that the sensing means is nonresponsive to noise transients. Means are further provided responsive to the operation of the sensing means to maintain said local signaling for a predetermined period. Additional means are provided to rapidly switch the associated line into a "hold" condition when required which rapid switching assures that associated PBX or central office equipment will not receive a premature line release indication. Means are further provided to perform all the necessary switching and supervisory functions required by the associated line.

31 Claims, 1 Drawing Figure

Patented March 7, 1972 3,647,983
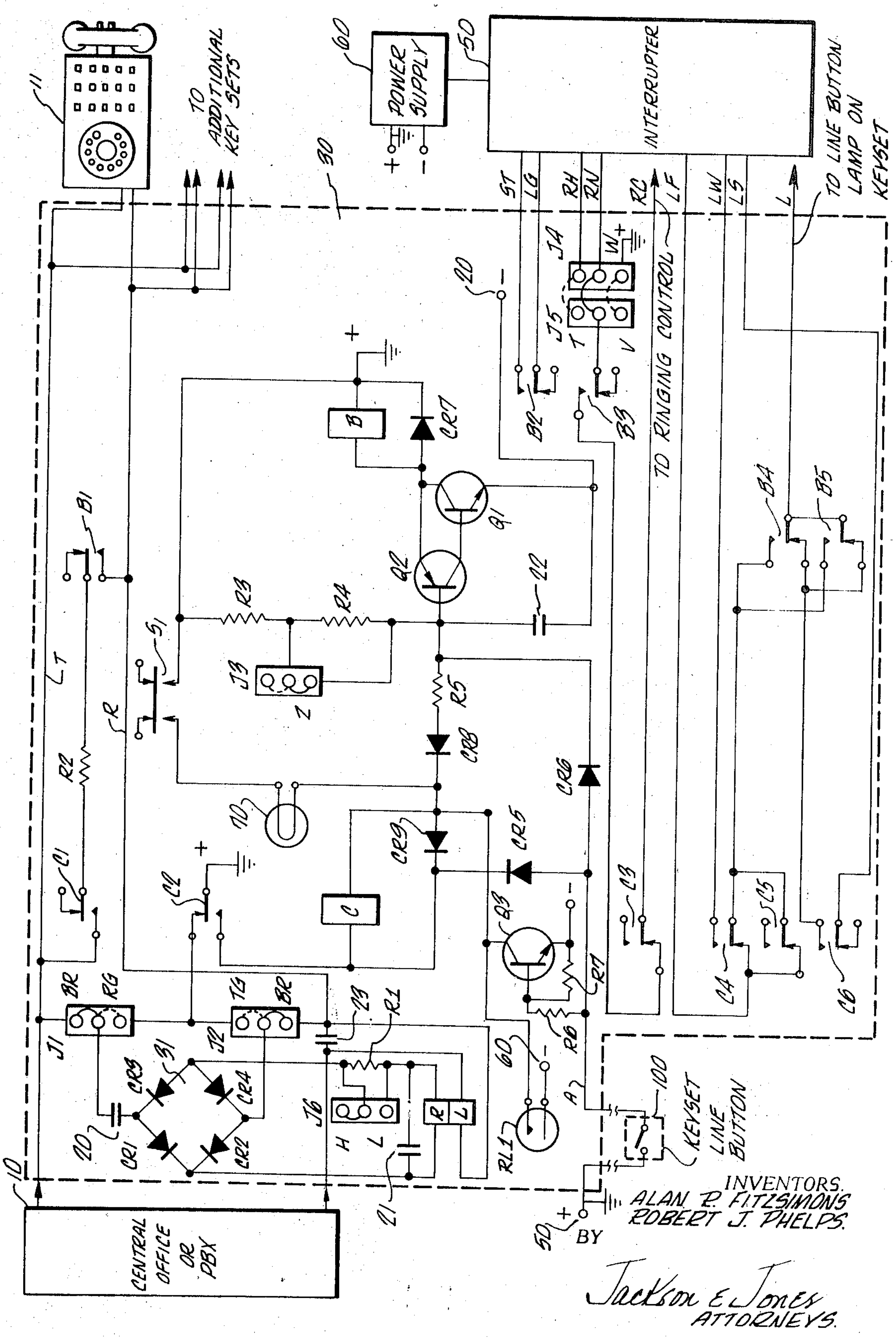
INVENTORS.
ALAN R. FITZSIMONS
ROBERT J. PHELPS.
BY
Jackson & Jones
ATTORNEYS.

KEY SYSTEM LINE CARD CIRCUIT

BACKGROUND OF THE INVENTION

1. Field of the Invention

This invention relates to telephone systems and more particularly to improvements in communication facilities located at the subscriber's premises known generally as key telephone switching facilities.

2. Description of the Prior Art:

Key telephone systems are customer controlled switching systems which permit using subscriber station sets for a plurality of telephone lines by allowing selective switching from one line to another. In addition, the switching system performs a plurality of control and supervisory functions necessary to allow the utilization of a plurality of telephone lines by each multiline station set.

Typically, each line controllable by a multiline subset has associated therewith a so-called line card (generally located in a central box at a subscriber station). Each line card contains the necessary components to perform all the required switching and supervisory operations required by its associated line no matter how many station sets have access to the line. These functions include audibly and/or visably signaling a subscriber station in response to the detection of a ringing signal from a central office or PBX switching point; placing a line in use in a "hold" condition so that the controlling party may use his subset for another line or intercom facility without losing his call; sensing the abandonment of an incoming call and thereafter clearing the abandoned line to make it available for further use; answering an incoming call by allowing subset connection to the incoming call line; and allowing call origination from the subscriber station by effecting seizure of the selected line.

Because of the multiplicity of functions to be performed each card is generally limited to operation in relation to a single line. Since the business community utilizes a tremendous number of key telephone units and associated lines, great effort has been directed towards increasing the reliability and reducing the complexity, size and cost of such line cards. Although significant strides have been taken in improving the reliability and performance of such cards within the confines of the above indicated economic considerations, modern commercially available line cards still suffer from a variety of imperfections.

Known line cards are generally of two types. The first type utilizes four or more relays both to sense the presence of ringing signals incident to an incoming call and to perform the many required switching and holding operations. Multiple relay sensing and switching circuits, however, are generally large in size. Further, the operating and release times of the relays often limit the speed of the various required switching operations. This limitation may lead to serious system malfunctions. For example, the switching time into the "hold" mode is so long that sensitive PBX or central office equipment occasionally receive a "line release" indication causing the line to be disconnected before it can be actually placed in the "hold" mode.

To overcome these and other deficiencies of multiple relay apparatus, the telephone industry has lately turned to using transistorized sensing and switching circuits. While such transistorized units do reduce overall line card size, they have introduced problems of their own.

As is known, transistor circuits require various associated biasing and current control components for proper operation. Such requirements multiply the total number of components required thus increasing the complexity of the resultant circuit. Further, use of line connected transistors to sense the presence of ringing signals incident to an incoming call request has resulted in a significant increase in experienced "-false ringing." This is caused by the highly sensitive line connected transistors interpreting line voltage transients (due to either disturbances on the line or variations in power supply voltage as ringing signals.

This oversensitivity has required telephone companies to replace their previous inexpensive power supply units with highly sophisticated and costly well-regulated power units to attempt to reduce power supply transients. This, of course, has not solved the problem caused by other line voltage transients.

Another defect in prior art line cards involves the inability of repair personnel to readily determine (at the line card station) which associated lines are in use. Such personnel must currently monitor each line before performing any repair work thereon or run the risk of disconnecting a call. It is, therefore, extremely desirable to provide such maintenance personnel with a ready indication of the condition of each line without requiring the cumbersome procedure of either breaking into or monitoring the lines.

SUMMARY OF THE INVENTION

Our invention comprises a novel line card circuit connected at the subscriber's location to perform all the required sensing and switching functions. Sensing means are provided to be operated by ringing signals in the line conductors. In one specific embodiment the sensing means comprises a double wound relay having a first winding operatively connected to the ring and tip leads from the PBX or central office to sense the presence of ringing current therein. The sensing relay, while responding to ringing signals, will not readily respond to line or circuit transients. Means are further provided to selectively connect the sensing means between the tip lead and ground or the ring lead and ground for "two party" operation.

Means are provided responsive to the operation of the sensing relay but electrically isolated from the line ringing signals to provide signals to all associated station set line buttons as an indication of the presence on the line of an incoming call. Circuit means are also provided to prepare a holding circuit for rapid connection across the ring and tip leads to assure that, should it subsequently be desired to place the incoming call in a hold condition, the line may be rapidly bridged to prevent loss of the call.

Further, means are provided responsive to the operation of the sensing relay to energize a "busy lamp" circuit which when switch actuated at the line card location informs maintenance personnel that the associated line is being used. Means are also provided responsive to line seizure at the subscriber location to provide the key set button with a continuous "line seized" signal.

Hold means are provided, responsive to operation of the "-hold" button on the telephone key set, to rapidly loop the T & R line leads with a characteristic impedance to prevent loss of the call and insure that the line is "held" in a seized condition. Means are also provided, responsive to operation of the "-hold" button on the key set to provide a "hold" signal to the key set button indicative that the line is in such a "hold" condition.

Upon call termination, effected by hand set replacement, the sensing relay is released and the line card circuit is placed in an idle condition making the associated line available for further use as desired.

Although the line card circuit of the present invention utilizes a sensing relay, circuit transistors and associated components, the circuit transistors are isolated from the telephone line pair. Line transients and power supply variations will not, therefore, induce "false ringing." Further, the line card circuit of the present invention is of considerably simpler design than prior configurations, significantly increasing system reliability. The line card requires fewer overall components while providing increased versatility and reliability.

BRIEF DESCRIPTION OF THE DRAWING:

The FIGURE is a block diagram and schematic of an embodiment of a line card circuit constructed in accordance with the principles of the present invention.

DESCRIPTION OF THE PREFERRED EMBODIMENT:

Referring now to FIG. 1, a subscriber keyset 11 is shown connected to a central office of PBX station 10 via line card circuit 30. Although FIG. 1 shows only one keyset connected to the depicted central office line, it is to be understood that any desired number may be additionally connected.

The line card circuit comprises a rectifying bridge 31 formed by four bridge connected diodes CR1, CR2, CR3, and CR4. A capacitor 20 is connected in series with the rectifying bridge 31 to prevent DC loop current through the bridge and provide a high bridging impedance to audio signals. The bridge and capacitor combination are selectively connected across the central office tip (T) and ring (R) leads via straps J1 and J2.

Strap J1 is provided with an adjustable U-link, as shown, to enable connection of one input lead of the bridge 31 to either the tip lead (T) or to ground via the normally closed contact C2 of a relay C, as shown. The U-link of the strap J1 may be selectively connected either in the BR position for bridged ringing or in the RG position for ringing ring lead (R) to ground, depending upon whether bridged or divided ringing is desired. In a like manner, strap J2 is provided with an adjustable U-link which is connected either in the BR position for bridged ringing or the TG position for ringing tip lead (T) to ground, depending upon whether bridged or divided ringing is desired. Connection in the divided ringing position allows a single line to be used for two distinct parties having two distinct numbers. Such a "two-party" application allows subscribers to parallel their own home line with those in the office. One number may be used as an office "daytime" number which when dialed will not cause any bell ringing at the home location. The other number can be used as a "night" number to effect ringing at the home location.

An R winding of a sensing relay RL is connected across the rectifier bridge, as shown, to sense the presence of ringing current provided by station 10 to the tip and ring leads. Relay RL is preferably a double wound dry reed-type sensing relay. A tank capacitor 21 is connected across the R winding of relay RL. Capacitor 21 in conjunction with resistor R1 functions as a tank circuit to prevent the relay R1 from "chattering" due to the presence of the ringing signal which periodically has a zero signal level. A strap J6 having an adjustable U-link connectable to short out resistor R1 (in the L position) is provided. With R1 shorted out the R winding of the RL relay will respond to a lower ringing voltage level.

When relay RL is operated, a contact RL1 of the relay allows application of a negative potential from a power supply 60 to the base of a transistor Q2 via a resistor R5 and a diode CR8. This negative potential serves to discharge a capacitor 22 (which capacitor has been previously charged by a positive potential through resistors R3 and R4 derived from the power supply 60 and applied to ground. Transistor Q2 will therefore switch into its conduction mode. Transistor Q2 conducting will switch "on" a transistor Q1 and hence energize an associated B relay which, as shown, is connected as the collector load of transistor Q1. It is to be understood that the power supply 60 is a conventional DC source and is intended to be employed with the present line card circuit 30 in a standard manner that is well known in the art. For example, it is a long-standing practice in the telephone field to have the positive terminal connected to ground. The "positive" potential is accordingly actually ground potential. The negative terminal may be typically −24 volts. Higher negative levels are used as is required.

Operation of contact RL1 of the RL relay makes potential available to light a busy lamp 70 which is in series electrical connection with contact RL1, a testing switch $S_1$ and ground. Busy lamp 70 provides maintenance personnel with an indicator at the line card location that the associated line is "busy." The condition of the line card circuit 30 may be interrogated at the line card location by simply closing switch $S_1$ and observing whether the lamp 70 is energized.

As above mentioned, operation of contact RL1 also operates the B relay which as shown may be equipped with a plurality of contacts B1, B2, B3, B4, and B5. The functions of the contacts, which are illustrated in their normal positions, are now considered. Operation of contact B2 of the B relay connects the lead ST to the line LG which starts the motor of standard interrupter 50. Suitable interrupters are well known and need not be described in detail here. Briefly, however, they typically include a motor which drives a plurality of cams which in turn open and close various contacts. The opening and closing of the contacts provides the desired interruptions in the signals applied to the various lamp and audible ringing circuits. This results in the characteristic lamp flashing, lamp winking and audible ringing signals which indicate the status of each line at the key set location.

Contact B3 of relay B upon operating connects a preselected ringing option to the ringing control line RC to energize an audible signal generator at the subscriber subset or at a local ringing station (not shown). The ringing option is selected by positioning an adjustable U-link interconnecting straps J5 and J4. With the U-link in the T position, a high voltage ringing signal (RH) is applied to the ringing control line RC. In the W position a normal voltage level ringing signal (RN) is applied to line RC while in the "V" position line RC is connected to ground and no audible ringing will occur.

Operation of contracts B4 and B5 of relay B connects the lamp flash line (LF) from the interrupter 50 to the pushbutton lamp on the keyset 11. Interrupter 50 provides a periodically interrupted (flashing) indication of the presence of an incoming call to the line button lamp on the keyset. The double set of contacts (B4 and B5) provides contact redundancy whereby failure of one contact will not impair system operation.

Operation of contact B1 of relay B completes a holding circuit comprising a resistor R2 by connecting R2 to the R lead. In the hold mode, the resistor R2 is connected across the R and T leads to maintain the line in a seized condition as will be hereinafter more fully described.

Relay B is maintained in an operated condition and the above operations are continued until the call is either answered or abandoned and timed out. If the call is abandoned, the ringing voltage of the incoming call ceases. The timeout charge during which time relay B remains operated is determined by the time constant of a discharge circuit comprising capacitor 22 and a pair of series connected resistors R3 and R4. A strap J3 having a U-link connectable as shown in a "Z" position may be used to short out resistor R4 to reduce the time constant of the discharge circuit and thus shorten the timeout period, if desired.

Assume now that a call is answered by a lift off of the handset and a pressing of the line pushbutton 100 on the keyset telephone instrument 11 corresponding to the incoming call line. The telephone instrument 11 loops the T and R leads in a well-known manner allowing the flow of DC current in the T-R loop. The resultant central office or PBX line circuit current will maintain the RL relay in an operated condition via its L winding which is connected as shown in series with the T-R loop. A capacitor 23 is connected in parallel with the L winding to assure that the presence of the relay winding does not degrade audio signals.

Operation of the keyset line button 100 connects the positive terminal of the power supply 60, to the "A" line lead. The positive or ground potential on the "A" lead is applied to the base of transistor Q2 via diode CR6, thus switching the transistor Q2 off. The B relay is therefore released. Contacts B2 and B3 of the B relay upon release function to stop the interrupter motor and disconnect the ringing audible signal respectively. Further, holding resistor R2 is disconnected from the ring lead by the opening of contact B1.

The positive potential on line A also functions to operate relay C via a circuit path that may be traced from the line button 100 through a diode CR5 and the relay C winding to the negative terminal of the power supply 60 via the closed relay contact RL1. The positive potential on line A further functions to prime a transistor Q3 to be rendered conductive to furnish an alternative hold path for relay C to the negative power terminal. The transistor Q3 will be rendered conductive by an opening of the relay contact RL1 provided that the line A is connected to the positive terminal of the power supply 60. The alternate hold path is required for reasons to be more fully described hereinafter.

The operation of relay C prepares the holding circuit by connecting resistor R2 to the tip lead T via contact C1 of relay C. Contact C2 of relay C when operated disconnects the ground connection from the ringing straps J1 and J2 and the bridge 31 to avoid ground noise pickup on the line during audio and also provides an alternate holding circuit for the C relay should the positive terminal connection to the "A" lead be removed. Diode CR5 prevents the holding positive from feeding back to the A line lead. Diode CR6 prevents the negative from being coupled through the RL1 contact, the relay C coil and the diode CR5 to operate the transistors Q1 and Q2 and relay B.

The operation of contact C3 of relay C functions to disconnect and prevent reconnection of the audible ringing signal should the relay B be reoperated. Upon operating contacts C5 and C4 of relay C disconnect the lamp flash line (LF) from the line button lamp. Contact and C6 upon operating connects a steady lamp signal line LS from the interrupter 50 to the line button lamp as an indication of the "call answered" condition. Use of contact pair C5 and C4 provides contact redundancy which assures proper circuit operation even if one contact becomes inoperable. Operation of the hold button on the telephone key releases the keyset line button 100 in a well-known manner. Release of button 100 removes the positive or ground potential from the "A" lead which rapidly reoperates transistor Q1 and Q2 and therefore relay B due to the negative potential applied through the relay RL1 contact. Reoperation of the B relay connects resistor R2 across the T and R leads via the closed contacts C1 and B1. This is the hold condition. Connection of resistor R2 to the T and R leads holds the RL relay operated via the central office or PBX line current by providing a substitute electrical path for the line current.

Operation of the B3 contact serves to restart the interrupter motor. Operation of contacts B4 and B5 connects the lamp wink (LW) lead from the interrupter to the line button lamp line L to provide a wink (hold) indication signal to the line button light. It should be noted, as previously mentioned, that the audible ringing line RL is not reconnected because the operation of contact C3 disconnects the RL line.

In the event an incoming call is placed on hold and the caller abandons that call, the central office or PBX will give a line disconnect condition characterized by an absence of T-R loop current. The absence of T-R loop current causes the RL relay to be released. Release of the RL relay releases the B and C relays thus restoring the line carol circuit to an idle condition.

In the talk condition the circuit is under control of either the transistor Q3, when conductive, or the RL relay which relay will normally remain operated since the L winding is in series with the telephone and the T-R loop. Receiver replacement and/or line button restoration will immediately release relay RL and will restore transistor Q3 to its nonconductive state placing the circuit 30 in an idle condition.

When originating a call from the keyset 11, line seizure is effected by pressing the keyset line button 100 with the receiver off hook. This serves to apply a positive potential to the A lead as previously discussed. The loop established tip to ring via the telephone instrument operates the RL relay via the L line connected winding. The RL1 contact operating will operate the C relay providing the associated line button lamp with a "line seized" steady light indication. The call is now dependent upon receiver replacement at call termination.

As above described, it is necessary for the C relay to be operated to assure that a steady light indication is provided to the associated line button lamp on the keyset. This steady light signal indicates to the line user that he is operating upon a "seized" line. In the circuit as thus far described, there is one possible instance when the C relay could become inactivated even when the associated line button 100 is activated. This occurs when station 10 is a facility such as a manual PBX facility. With such a facility a call is typically initiated when the caller depresses a keyset line button, picks up his handset, and reaches a PBX operator whereupon he designates his call request. The operator customarily thereafter places the callers line in a "PBX hold" condition while the request is executed.

This "PBX hold" condition may totally disconnect the subscriber T-R line pair from the central office line side. The disconnection removes the source of T-R line current which is required to operate the RL relay. The RL relay thus releases, causing the release of the C relay. Release of the C relay disrupts the light signal to the subscriber line button 100 and thereby gives the caller the impression that he has lost the operator. Depending upon the conscientiousness of the operator, this condition might last for several minutes.

To insure that the C relay remains operated should the RL relay inadvertently release, a transistor Q3 is connected to shunt the RL1 contact to provide a holdover connection for the C relay. The base of transistor Q3 is connected via resistor R6 to the positive potential on the A lead. A resistor R7 is connected between the base and emitter electrodes. As shown, the collector terminal of transistor Q3 is connected to the RL1 contact and also to the positive terminal of the supply 60 via relay coil C. With line button 100 operated, depressed, current will be permitted to flow from the negative terminal through the resistors R7 and R6 and the line button 100 back to the positive terminal of the supply 60 to properly bias the base of transistor Q3 with respect to the emitter thereof. Since the RC1 contact is open, the collector lead is also properly biased by being maintained at ground potential. Transistor Q3 will therefore conduct and provide an alternate current path to hold the C relay. The line button light will therefore remain lit until the PBX operator reconnects subscriber lineside to the central office power.

There has, therefore, been described a line card circuit of simple design. The line card is capable of performing all the required switching and supervisory functions while providing significantly increased reliability.

It should be noted that while the circuit for initiating the local signaling is activated by operation of the RL1 relay contact it is not electrcially connected to the line pair and is therefore electrically isolated from the ringing signals.

What is claimed is:

1. A line card circuit for a telephone system which includes a subscriber line formed by a pair of line conductors interconnecting a central office with a subscriber station set, the subscriber set having means for looping the line conductors to provide a current loop, said circuit comprising:

sensing means responsive to ringing signals in said line conductors to be operated thereby, said sensing means including means responsive to current and a rectifier bridge selectively connected to each of said line conductor pair or to ground, said rectifier having first and second output terminals providing rectified outputs responsive to receipt by said bridge of ringing signals;

means responsive to the operation of said sensing means and electrically isolated from said ringing signals for initiating local signaling; and means responsive to the operation of said sensing means for maintaining said local signaling for a preselected period.

2. The circuit of claim 1 further comprising:

a busy indication circuit at said line card location said circuit including a busy indication device for providing a busy indication signal; and means responsive to current in said loop and to the operation of said sensing means for energizing said busy indication circuit.

3. The circuit of claim 2 wherein said busy indication circuit further comprising:

switch means in series electrical connection with said busy indication device whereby upon operation of said sensing means responsive to current in said loop and upon operation of said switch means said busy indication device provides a busy indication signal.

4. The circuit of claim 3 wherein said busy indication device is a lamp which upon energization provides a light signal.

5. The circuit of claim 1 further comprising:

signal terminating means responsive to the operation of said looping means for terminating said local signaling.

6. The circuit of claim 5 further comprising:

hold circuit preparing means responsive to the operation of said looping means for preparing a hold circuit for rapid connection across said line conductors.

7. The circuit of claim 6 wherein said hold circuit comprises an impedance having first and second terminals, and wherein said hold circuit preparing means comprises:

means for connecting said first terminal to one of said line conductors responsive to the operation of said looping means; and means for subsequently rapidly connecting said second terminal to the other of said line conductors.

8. The circuit of claim 1 wherein said sensing means comprises:

a double wound relay having a first operating coil connected to receive and be operated by ringing signals in said subscriber line.

9. The circuit of claim 1 wherein said sensing means further comprises:

a double wound relay having first and second windings, said first winding connected across said first and second bridge output terminals, said second winding connected in series electrical relationship with said current loop.

10. The circuit of claim 9 further comprising:

a capacitor connected across said first winding for holding said relay activated during periods of low ringing signal level.

11. The circuit of claim 1 further comprising:

switching means for selectively switching said sensing means between one of said line conductors and ground or the other of said line conductors and ground, whereby said subscriber line may be used for two-party operation.

12. The circuit of claim 8 further comprising:

means for selectively varying the sensitivity of said relay.

13. The circuit of claim 12 wherein said selective sensitivity varying means comprises:

a resistor connected in series electrical connection with said first operating coil; and means for selectively shorting out said series connected resistor.

14. A telephone line circuit for use with telephone systems characterized by at least one key telephone unit and a pair of line conductors adapted to be interconnected by operation of said key telephone unit, said telephone line circuit comprising:

sensing means for detecting ringing signals applied to said line conductors, said sensing means including a rectifier for providing direct current signals in response to said ringing signals, and a first coil of a first relay having first and second coils, said first coil being responsive to said direct current signals from said rectifier, said second coil being connected in one of said line conductors.

15. The telephone line circuit defined by claim 14 wherein voice signals are applied to said line conductors when said telephone system is in use, and wherein said first coil enables activation of said line circuit in response to said direct current signals, said second coil enabling activation of said line circuit in response to interconnection of said paid of line conductors by operation of said key telephone unit, said line circuit further including capacitive means coupled in parallel to said second coil for rendering said second coil operatively unaffected by said voice signals.

16. The telephone line circuit defined by claim 14 further comprising:

means, including a second relay responsive to operation of said first relay, for enabling ringing at said key telephone unit; and means, including said second relay for connecting a holding impedance between said pair of line conductors.

17. The telephone line circuit defined by claim 16 further comprising means for preventing ringing at said key telephone unit whenever said line conductors are interconnected by operation of said key telephone unit or by said holding impedance.

18. A telephone line circuit for use with telephone systems including at least one key telephone unit and a pair of line conductors to which ringing signals and line current are applied and which are adapted to be interconnected by operation of said key telephone unit, said telephone line circuit comprising:

a full-wave rectifier having a pair of input terminals and a pair of output terminals, said input terminals being adapted to be connected between said line conductors, said rectifier providing direct current signals at said output terminals in response to said ringing signals; and a first relay having first and second coils and a contact responsive to energization of one of said first and second coils, said first coil being connected to be energized by direct current signals, said second coil connected to be energized by said line current.

19. The apparatus defined by claim 18 further including:

a ringing circuit including a second relay for selectively enabling ringing at said key telephone unit in response to operation of said contact; and a holding circuit including said second relay for connecting an impedance between said line conductors to have said line conductors maintained in a hold position.

20. The apparatus defined by claim 19 further including:

means having a third relay for controlling the presence of visual indications at said key telephone unit when in operation; and means for maintaining said third relay in an energized condition when said key telephone unit is in operation.

21. A telephone line circuit for use with telephone systems including a key telephone unit and a pair of line conductors to which ringing signals and line current are applied and which are adapted to be connected through said key telephone unit by operation thereof, said telephone line circuit comprising:

first means including a first relay for energizing said line circuit in response to said ringing signals or to the flow of said line current through said line conductors when interconnected;

second means for enabling ringing at said key telephone unit in response to said ringing signals; and third means responsive to the operation of said key telephone unit for enabling the presentation of visual operation indicators at said key telephone unit.

22. The apparatus defined by claim 21 wherein said second means includes a second relay and said third means includes a third relay, said line circuit further comprising fourth means including said second and third relays for connecting an impedance between said line conductors to have said line conductors maintained in a hold condition.

23. The apparatus defined by claim 22 further comprising means for maintaining said third relay, once energized, in an energized condition for as long as said key telephone unit is operated.

24. The apparatus defined by claim 21 wherein said first relay includes first and second coils and a contact, said first coil being adapted to be energized in response to the presence of ringing signals, said second coil being adapted to be energized in response to the presence of line current, said contact being operated in response to the energization of either of said first and second coils.

25. The telephone line circuit defined by claim 21, said first means further including a rectifier connected between said line conductors for causing operation of said first relay in response to the presence of said ringing signals.

26. The telephone line circuit defined by claim 21, wherein voice signals are applied to said line conductors when said telephone system is used, said first relay including a first coil operatively connected between said line conductors and a second coil connected in one of said line conductors, said first coil being connected to be energized in response to the application of ringing signals to said line conductors, said second coil being energized by said flow of line current, said line circuit further including means for rendering said second coil insensitive to said voice signals.

27. A telephone line circuit for use with key telephone systems including at least one key telephone having a hold button and connected to a central facility by a pair of line conductors, said key telephone systems having a ringing condition during which ringing signals are applied to said line conductors, a seize condition characterized by said line conductors being interconnected by operation of said key telephone, and a hold condition characterized by the connection of a holding impedance between said line conductors in response to operation of the hold button, line current being applied to said line conductors during said seize and hold conditions, said telephone line circuit comprising:

ringing means for controlling ringing at the key telephone;

first means for detecting ringing signals applied to said line conductors during said ringing condition and for controlling the ringing means to provide ringing at said key telephone, said first means being connected between the line conductors; and second means for detecting line current in said line conductors during said seize and hold conditions for controlling the ringing means to prevent ringing at the key telephone, said second means connected in one of said line conductors.

28. The telephone line circuit defined by claim 27 further comprising holding means for placing the system in a hold condition, said holding means including:

a holding impedance, and first and second switches connected in series with the holding impedance, the first and second switches serving to connect the holding impedance between said line conductors when both first and second switches are operated; said first means including:

ringing signal detector means for detecting said ringing signals applied to said line conductors, and a first relay, operated by said ringing signal detector means for controlling said ringing means to provide ringing at said key telephone, said first relay also operated in response to operation of the hold button for operating the first switch of the holding means; said second means including:

line current detector means for detecting the flow of line current in said line conductors, and a second relay operated by said line current detector means for controlling said ringing means to prevent ringing at said key telephone and for operating the second switch of the holding means, whereby the hold condition is only produced by concurrent operation of both first and second relays.

29. The telephone line circuit defined by claim 28 wherein said key telephone system also includes a ringer and a power source adapted to be controllably interconnected through said ringing means to provide ringing at the key telephone, said ringing means including:

a ringing conductor for controllably interconnecting the ringer and the power source; and third and fourth switches connected in series in said ringing conductor for individually completing or breaking the continuity of the ringing conductor, said third switch being operated by said first relay to complete the continuity of said ringing conductor to allow interconnection of said ringer and power source by the ringing conductor, said fourth switch being operated by said second relay to break the continuity of the ringing conductor to prevent interconnection of the ringer and power source by the ringing conductor.

30. The telephone line circuit defined by claim 29, said line current detector means including a third relay connected in one of said pair of line conductors to be operated by line current in said line conductors, said third relay releasing the telephone system from said hold condition in response to a polarity reversal across said line conductors.

31. The telephone line circuit defined by claim 30, said ringing signal detector means including said third relay and a rectifier connected between said line conductors for causing operation of said third relay in response to said ringing signals.

* * * * *